June 21, 1960  P. J. KIRCHER  2,942,082

THERMOSTATIC SWITCHING DEVICE

Filed March 6, 1959

INVENTOR.
PAUL J. KIRCHER
BY
*Lindsey and Prutzman*
ATTORNEYS

United States Patent Office 2,942,082
Patented June 21, 1960

2,942,082

THERMOSTATIC SWITCHING DEVICE

Paul J. Kircher, Plainville, Conn., assignor to Landers, Frary & Clark, New Britain, Conn., a corporation of Connecticut Filed Mar. 6, 1959, Ser. No. 797,666

9 Claims. (Cl. 200—138)

This invention relates generally to thermostatic switches and more particularly to an improved thermostatic switch which provides an indication of the magnitude of the temperature that is sensed and controlled by the switch.

In heating devices, such as irons and the like, which utilize thermostatic switches to cyclically energize a heating element so as to maintain a preset temperature, it is very desirable to have an indicator which will tell whether or not the iron has reached the preset temperature. It is therefore a primary object of this invention to provide a thermostatic switching device that will control temperature as well as operate a temperature indicator.

It is a further object of this invention to provide a thermostatic switching device having an auxiliary switch whose contacts close only when the preset temperature has been achieved.

It is an additional object of this invention to provide a compact unitary switching assembly which not only controls the temperature of a heating device but also provides a circuit controller which is actuated only when the preset temperature is reached.

It is a still further object of this invention to provide an inexpensive and reliable thermostatic switching device for controlling the adjustably preset temperature of an electrically heated implement and for controlling an indicator to signify when the implement has reached the preset temperature.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
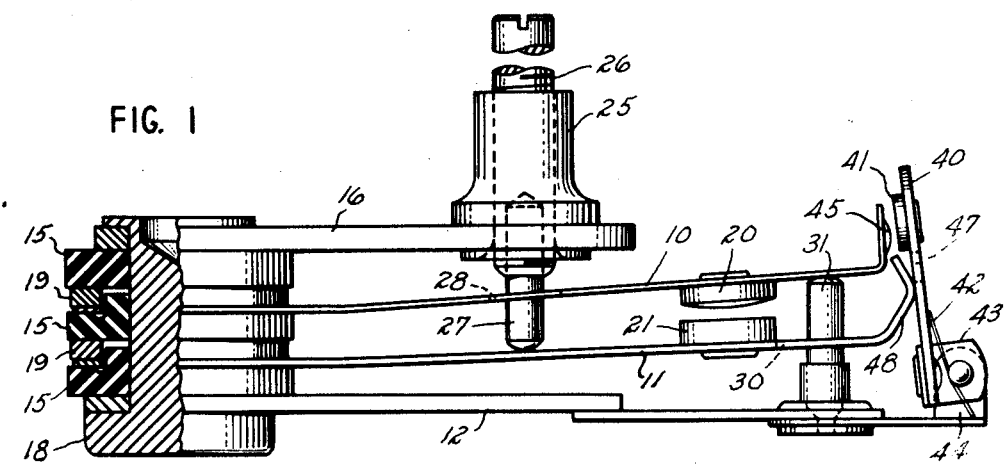
Fig. 1 is a partially cut away side elevational view of a preferred embodiment of the switching device of this invention.

Referring to the drawings, it is seen that a switching device made in accordance with this invention is provided with a movable switch arm 10, an adjustable switch arm or first member 11 and a thermometal or second member 12 which are electrically insulated and physically separated from each other by a plurality of insulating segments 15. This assembly forms the main switch and is clamped to frame 16 in cantilever fashion by rivet 18 and is provided with two annular conductive rings 19 which form terminals for establishing appropriate electrical connections to the movable switch arm 10 and the adjustable switch arm 11. It is noted that the term "thermometal" refers to metallic structures which deflect in response to changing temperature and includes bimetallic structures. Movable switch arm 10 is formed of a light gauge flexible conducting material and carries a first main contact 20 adjacent its outer end. Adjustable switch arm 11 is made of slightly heavier conducting material than switch arm 10 and is provided with a second main contact 21 positioned in alignment with contact 20. In the preferred embodiment, switch arms 10 and 11 are bent so that contact 21 is biased in an upward direction and contact 20 is biased in a downward direction so as to urge the contacts 20 and 21 into engagement.

Frame 16 has fastened thereto an adjusting sleeve 25 which is provided with a central threaded aperture to threadably support temperature adjusting screw 26. Screw 26 is provided with a depending insulating plug 27 which passes through aperture 28 in switch arm 10 to engage switch arm 11. Because switch arm 11 is biased in an upward direction and into engagement with adjusting plug 27, rotation of adjusting screw 26 will change the position of switch arm 11 and contact 21 relative to frame 16. Such an arrangement provides the means for adjusting the temperature at which the main switch operates.

Figure 4:
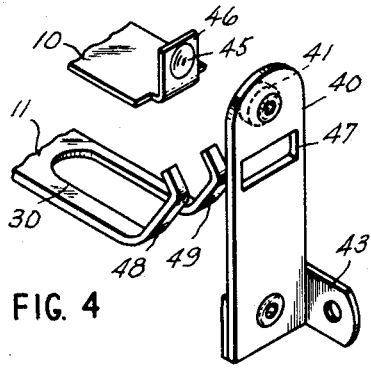
Fig. 4 is a partial perspective view of the switching device of Fig. 1.

Thermometal 12 is of conventional bimetal construction and is arranged to provide upward deflection with increasing temperature. As most clearly seen in Figs. 1 and 4, switch arm 11 is provided with a bifurcated end to define a slot 30 through which the rod-like projection 31 passes to engage switch arm 10. Projection 31 is made of insulating material and is secured to bimetal 12 in any desired manner so that deflection of the thermometal in an upward direction brings projection 31 into contact with arm 10 so as to separate contacts 20 and 21 at a temperature determined by the pre-adjusted position of contact 21.

With the switching device, as thus far described, installed in an electrical heating device such as a conventional iron so that the energization of the electrical heating element is controlled by a circuit through contacts 20 and 21 and switch arms 10 and 11, and with bimetal 12 positioned in good heat sensing relationship with the sole plate of the iron, it is seen that bimetal 12 will deflect in accordance with the temperature of the sole plate to control energization of the heating element. With temperature adjusting screw 26 connected to a fabric or temperature selector dial on the iron and after a temperature has been preset by adjustment of the screw, a cold iron will then be heated since contacts 20 and 21 will be in engagement to close the heating circuit. When the desired temperature has been reached, bimetal 12 will deflect to bring abutment 31 into contact with switch arm 10 so as to separate contacts 20 and 21. The heating element will then be energized in a cyclical manner since bimetal 12 will oscillate to energize and de-energize the iron to maintain an average sole plate temperature substantially in accordance with that selected by the fabric dial.

Assuming that the iron has been operating at a relatively high temperature, if the user now sets the temperature dial to utilize the iron at a lower temperature, it is apparent that the iron will initially be too hot for the intended low temperature use. Conversely, setting the temperature dial to a higher temperature requires that the operator delay further ironing until the higher temperature is reached by the sole plate. In either case, the necessary delay period is of indefinite length if the user is not provided with a reliable temperature indicator.

In order to eliminate the aforementioned uncertainties and to provide a reliable indication of sole plate temperature, the instant invention provides an auxiliary switch arm 40 secured to the outer end of the bimetal 12 and arranged so that a first auxiliary contact 41 is supported for generally pivotal movement in a direction perpendicular to the direction of movement of bimetal 12 and contacts 20 and 21. In the illustrated preferred embodiment, switch arm 40 is riveted to arm 43 which is pivotally secured to upstanding abutment 44 on thermometal 12. Spring 42 is used to bias auxiliary switch arm 40 in counterclockwise direction, or, in the alternative, switch arm 40 can be constructed of a resilient material, thereby permitting elimination of spring 42 and pivotal support 43, 44. As most clearly seen in Figs. 1 and 4, a second auxiliary contact 45 is mounted on bent-up end 46 of switch arm 10 and positioned to cooperate with contact 41. Auxiliary switch arm 40 is provided with a generally rectangular aperture 47 which cooperates with the V-shaped bent-up ends 48 and 49 of bifurcated switch arm 11. Controlled relative movement of aperture 47 and ends 48 and 49 of arm 11 causes movement of contact 41 relative to contact 45 to make and break an electrical circuit connected thereto as hereinafter explained.

Figure 2:
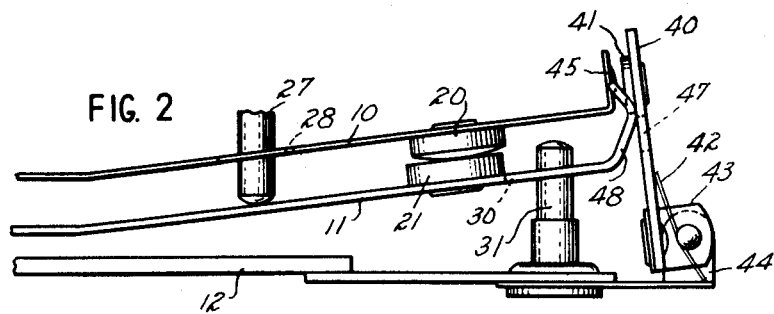
Fig. 2 is a partial side view of the device of Fig. 1 showing switch contact position when the temperature is below the preset level.
Figure 3:
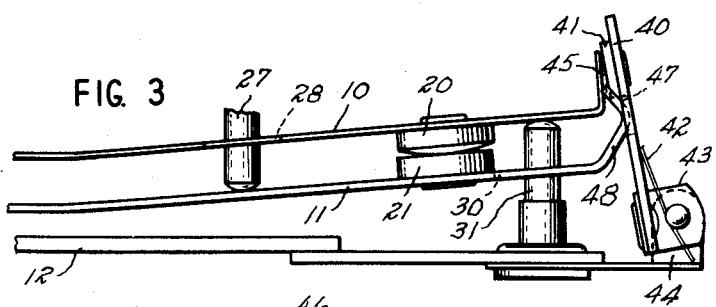
Fig. 3 is a partial side view of the device of Fig. 1 showing the contact position when the switching device has reached the preset temperature.

Assuming that adjusting screw 26 has been rotated to a preselected temperature position so as to correspondingly position switch arm 11, and assuming that the heating device, whose temperature is sensed by thermometal 12, is below the preselected temperature, it is seen that the various switching elements of the invention will assume the position of Fig. 2. In this position, main contacts 20 and 21 are engaged so as to complete the circuit to the associated heating element but auxiliary contacts 41 and 45 are displaced from each other by engagement of the V-shaped projections 48 and 49 of switch arm 11 with the auxiliary switch arm 40 above aperture 47. As the temperature of bimetal 12 rises in accordance with the increasing temperature of the heated surface, bimetal 12 will deflect upwardly until the various elements of the switching device reach the position shown in Fig. 3 in which both the main contacts 20 and 21 and the auxiliary contacts 41 and 45 are shown in a closed position. Auxiliary contacts 41 and 45 come into engagement with each other only when projections 48 and 49 engage aperture 47 on auxiliary switch arm 40 to permit contact 41 to pivot in a counterclockwise direction into engagement with contact 45. Aperture 47 and projections 48 and 49 are relatively dimensioned to permit auxiliary switch arm 40 to maintain auxiliary contacts 41 and 45 in engagement with each other even though thermometal 12 and switch arm 10 cycle or oscillate about the preset temperature point to maintain an average temperature in accordance with the selected position of switch arm 11. Thus, an indicating device connected in series with contacts 41 and 45 will remain continuously energized during the aforementioned main contact oscillation; for example, an indicating light will show a steady illumination rather than to flicker.

Assuming that a lower temperature is now set by the adjusting screw 26, it is seen that switch arm 11 will move downwardly with respect to bimetal 12 and switch arm 10 so as to separate main contacts 20 and 21. As switch arm 11 moves down, projections 48 and 49 move out of slot 47 and force auxiliary switch arm 40 to pivot in a clockwise direction so as to break the circuit connected to auxiliary contacts 41 and 45 and de-energize the indicating device. This condition is shown in Fig. 1. As the temperature of bimetal 12 reaches the preset temperature, projections 48 and 49 will again slip into aperture 47 to permit contact 41 to pivot into engagement with contact 45 to energize the indicating device.

In a like manner, if a higher temperature is desired and switch arm 11 is set in the higher temperature position as determined by adjusting screw 26, the switching mechanism will behave as previously described for the initial condition under which the bimetal 12 was cold.

Although no electrical heating elements or electrical indicating circuitry have been illustrated, it is to be understood that any conventional circuitry can be used; for example, the contacts 20 and 21 can be placed in series with the electrical heating element by connection of the appropriate circuit to the terminals 19; the desired indicator can be controlled by the auxiliary contacts 41 and 45 by establishing appropriate electrical connections to these contacts to place them in series with the indicating device.

From the foregoing description that I have provided, a compact and reliable thermostatic switching device which not only controls the temperature of a heating device such as an electric iron, but which also provides a positive indication of the temperature of the heating device as indicated by the relative position of the switch arm 11 and the thermometal 12 is produced. The auxiliary switching device is continuously closed even though the main switch cycles to maintain a preset temperature and is closed only when the preset temperature is reached and is opened when a desired temperature either above or below the present temperature is selected by rotating the temperature adjusting screw.

As will be apparent to persons skilled in the art, various modifications and adaptations of the structure above described will become readily apparent without departure from the spirit and scope of the invention, the scope of which is defined in the appended claims.

I claim:

1. A thermostatic switching device comprising a movable switch arm having a first contact mounted thereon, a first member having a second contact mounted thereon and positioned to cooperate with said first contact to make and break an electrical circuit, a second member movable in response to changes in temperature, means on said second member engageable with said movable switch arm to effect relative movement of said first and second contacts, an auxiliary switch arm having a first auxiliary contact mounted thereon, means mounting said auxiliary switch arm on one of said members for pivotal movement relative thereto, means on said auxiliary switch arm engageable with the other of said members to pivot said auxiliary switch arm to a first position when said members are in a predetermined relative position, and a second auxiliary contact aligned with said first auxiliary contact and engageable therewith when said auxiliary switch arm is in said first position.

2. A thermostatic switching device comprising a movable switch arm having a first contact mounted thereon, a first member having a second contact mounted thereon and positioned to cooperate with said first contact to make and break an electrical circuit connected thereto, a second member of bimetallic construction movable in response to changes in temperature, means on said second member engageable with said movable switch arm to effect separation of said first and second contacts, an auxiliary switch arm having a first auxiliary contact mounted thereon, means mounting said auxiliary switch arm on one of said members for pivotal movement relative thereto, means on said auxiliary switch arm engageable with the other of said members to pivot said auxiliary switch arm to first position only when said members are in a predetermined relative position, and a second auxiliary contact mounted on said movable switch arm in alignment with said first auxiliary contact and engageable therewith when said auxiliary switch arm is in said first position.

3. A thermostatic switching device comprising a movable switch arm having a first contact mounted thereon, a first member having a second contact mounted thereon and positioned to cooperate with said first contact to make and break an electrical circuit connected thereto, a second member movable in response to changes in temperature, means on said second member engageable with said movable switch arm to effect relative movement of said first and second contacts, means for adjusting the position of said first member thereby to adjust the temperature at which said second member causes relative movement between said first and second contacts, an auxiliary switch arm having a first auxiliary contact mounted thereon, means mounting said auxiliary switch arm on one of said members for limited pivotal movement relative thereto, means on said auxiliary switch arm engageable with the other of said members to pivot said auxiliary switch arm to a first position when said members are in a predetermined relative position and to maintain said auxiliary switch arm in said first position during a limited range of relative movement between said members thereby to maintain said auxiliary switch arm in said first position during cycling movement of said second member, and a second auxiliary contact aligned with said first auxiliary contact only when said auxiliary switch arm is in said first position.

4. A thermostatic switching device comprising a resilient switch arm having a first contact mounted thereon, a first member of resilient material having a second contact mounted thereon and positioned to cooperate with said first contact to make and break an electrical circuit, a second member of bimetallic construction movable in response to changes in temperature, means on said second member engageable with said movable switch arm to effect relative movement of said first and second contacts, an auxiliary switch arm having a first auxiliary contact mounted thereon, means mounting said auxiliary switch arm on one of said members for pivotal movement about an axis perpendicular to the direction of relative movement of said first and second contacts, means on said auxiliary switch arm engageable with the other of said members to pivot said auxiliary switch arm to a first position when said members are in a predetermined relative position, and a second auxiliary contact mounted on said movable switch arm and aligned with said first auxiliary contact so as to be engageable therewith upon pivotal movement of said movable switch arm into said first position.

5. A thermostatic switching device comprising a movable switch arm having a first contact mounted thereon, a first member having a second contact mounted thereon and positioned to cooperate with said first contact to make and break an electrical circuit, a second member movable in response to changes in temperature, means supporting said movable switch arm, first member, and second member in cantilever manner with said first member disposed between said second member and said movable switch arm, said last named means including an adjustable abutment for varying the position of said first member relative to said second member, means carried by said second member and engageable with said movable switch arm to effect relative movement of said first and second contacts, an auxiliary switch arm having a first auxiliary contact mounted thereon, means mounting said auxiliary switch arm on one of said members for pivotal movement relative thereto, means on said auxiliary switch arm engageable with the other of said members to pivot said auxiliary switch arm to a first position only when said members are in a predetermined relative position and a second auxiliary contact supported by said movable switch arm in alignment with said first auxiliary contact and engageable therewith when said auxiliary switch arm is in said first position.

6. A thermostatic switching device comprising a movable switch arm having a first contact mounted thereon, a second switch arm having a second contact mounted thereon and positioned to cooperate with said first contact to make and break an electrical circuit, a thermometal movable in response to changes in temperature, means on said thermometal engageable with said movable switch arm to effect relative movement of said first and second contacts, an auxiliary switch arm having a first auxiliary contact mounted thereon, means mounting said auxiliary switch arm on said thermometal for pivotal movement relative thereto, means on said auxiliary switch arm engageable with said second switch arm to pivot said auxiliary switch arm to a first position when said second switch arm and said thermometal are in a predetermined relative position, and a second auxiliary contact aligned with said first auxiliary contact and engageable therewith when said auxiliary switch arm is in said first position.

7. A thermostatic switching device comprising a movable switch arm having a first contact mounted thereon, a second switch arm having a second contact mounted thereon and positioned to cooperate with said first contact to make and break an electrical circuit, a thermometal movable in response to changes in temperature, means on said thermometal engageable with said movable switch arm to effect relative movement of said first and second contacts, an auxiliary switch arm having a first auxiliary contact mounted thereon, means mounting said auxiliary switch arm on said thermometal for pivotal movement about an axis perpendicular to the direction of thermometal movement, means on said auxiliary switch arm engageable with said second switch arm to pivot said auxiliary switch arm to a first position when said second switch arm and said thermometal are in a predetermined relative position, and a second auxiliary contact mounted on said movable switch arm in alignment with said first auxiliary contact and engageable therewith when said auxiliary switch arm pivots into said first position.

8. A thermostatic switching device comprising a movable switch arm having a first contact mounted thereon, a second switch arm having a second contact mounted thereon and positioned to cooperate with said first contact to make and break an electrical circuit, a bimetal movable in response to changes in temperature, means on said bimetal engageable with said movable switch arm to effect relative movement of said first and second contacts, an auxiliary switch arm having a first auxiliary contact mounted thereon, means mounting said auxiliary switch arm on said bimetal for pivotal movement about an axis perpendicular to the direction of bimetal movement, an aperture in said auxiliary switch arm disposed intermediate the first auxiliary contact and the pivot axis, a generally V-shaped abutment on said second switch arm extending outwardly therefrom towards said auxiliary switch arm, said abutment being engageable with said aperture to permit pivotal movement of said auxiliary switch arm to a first position, and a second auxiliary contact aligned with said first auxiliary contact and engageable therewith when said auxiliary switch arm is in said first position.

9. A thermostatic switching device comprising a movable switch arm having a first contact mounted thereon, a second switch arm having a bifurcated end and a second contact mounted adjacent said bifurcated end, a bimetal arranged to deflect upwardly in response to increasing temperature, means supporting said movable switch arm, said second switch arm and said bimetal in cantilever manner with said second switch arm disposed intermediate said bimetal and said movable switch arm and electrically insulated therefrom, an upstanding abutment carried by said bimetal positioned to pass through said bifurcated end in said second switch arm into engagement with said movable switch arm to effect relative movement of said first and second contacts in accordance with bimetal movement, an auxiliary switch arm having a first auxiliary contact mounted thereon, means mounting said auxiliary switch arm on said bimetal for pivotal movement relative thereto about an axis perpendicular to the direction of bimetal movement, an aperture in said auxiliary switch arm disposed intermediate said auxiliary contact and the pivot axis, said bifurcated end of said second switch arm having an abutment thereon of V-shaped vertical cross-section engageable with said switch arm and movable into said aperture in said auxiliary switch arm to permit pivoting of said auxiliary switch arm to a first position only when said bimetal and said second switch arm are in a predetermined relative position, and a second auxiliary contact mounted on said movable switch arm in alignment with said first auxiliary contact and engageable therewith when said auxiliary switch arm pivots into said first position.

No references cited.